UNITED STATES PATENT OFFICE.

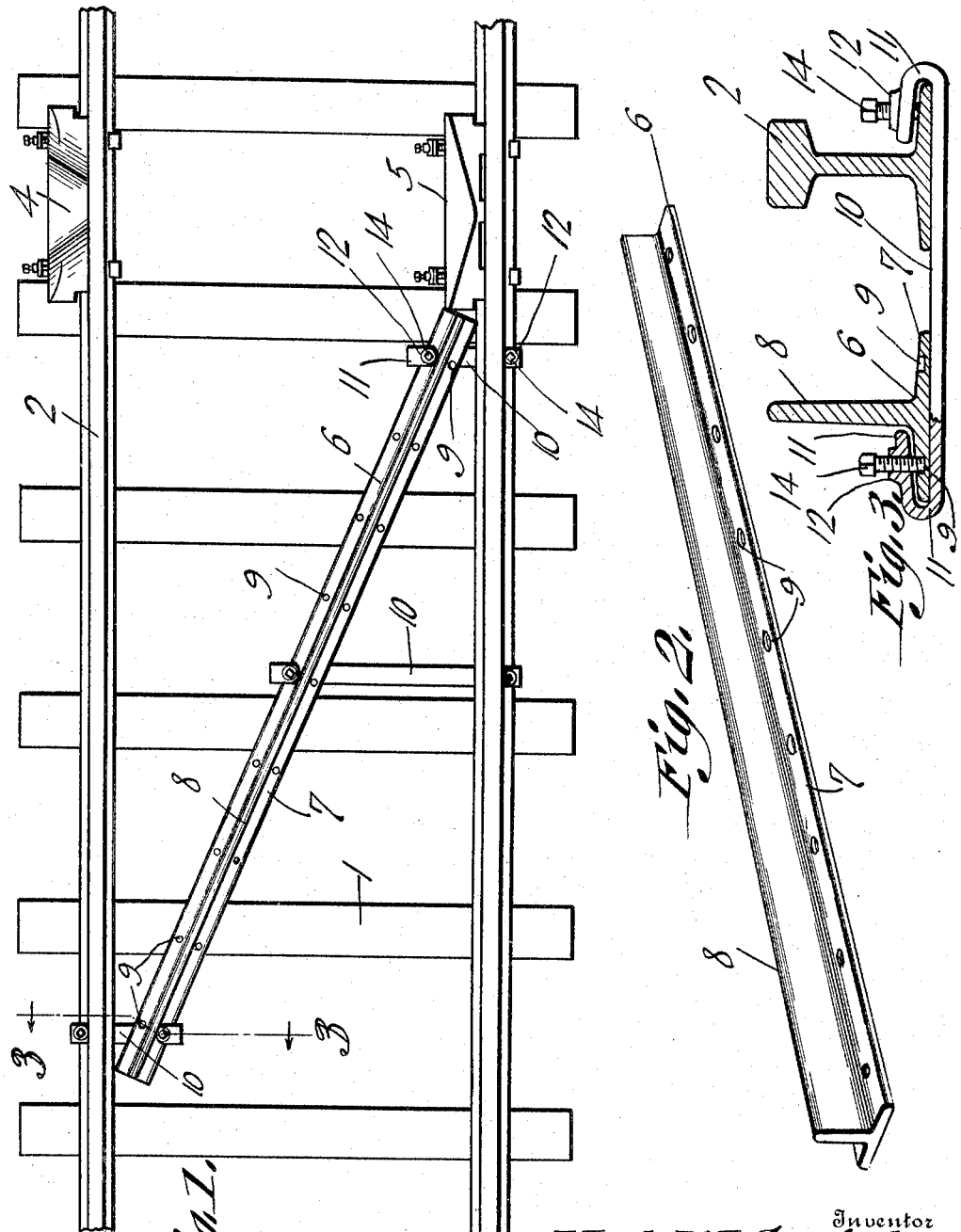

HENRY A. W. SMITH, OF CHATHAM, VIRGINIA.

RERAILER.

1,325,809.     Specification of Letters Patent.     Patented Dec. 23, 1919.

Application filed June 25, 1919. Serial No. 306,515.

*To all whom it may concern:*

Be it known that I, HENRY A. W. SMITH, a citizen of the United States, residing at Chatham, in the county of Pittsylvania and State of Virginia, have invented a new and useful Rerailer, of which the following is a specification.

It is the object of this invention to provide a guide rail of novel form, adapted for use in connection with a rerailer, and to provide novel means for holding the guide rail on a track rail.

Within the scope of what is claimed, a mechanic may work changes without departing from the spirit of the invention.

In the drawings:—Figure 1 shows the invention in top plan placed properly with respect to a rerailer and a pair of track rails; Fig. 2 is a perspective of the guide rail; Fig. 3 is a cross section on the line 3—3 of Fig. 1.

Ties 1 are shown, the same supporting track rails 2 and 3. A rerailer 4 coöperates with the rail 2, a rerailer 5 coacting with the rail 3. These rerailers may be of the form shown in my prior Patent No. 1,305,625, dated June 3, 1919. A guide rail 6, in the form of an inverted T, is disposed diagonally between the rails 2 and 3 and leads to the rerailer 5, the guide rail including a base 7 and an upstanding flange 8. The base 7 is provided with seats 9 extended but part way therethrough. Transverse braces 10 are provided, the same having ends 11 overhanging the base 7 of the guide rail 6 and the base flanges of the rails 2 and 3, said ends having bosses 12 wherein set screws 14 are threaded, one set screw on each brace engaging one of the seats 9 of the base 7 of the guide rail 6, and the other screw bearing upon the base flange of one track rail.

As many or as few of the braces 10 as may be considered necessary, may be used, and the braces may be arranged as circumstances may demand. A simple means is provided, whereby the guide rail 6 may be mounted quickly in place and be removed speedily. The guide rail may of course be reversed, to correspond to the direction in which the derailed car is moved. The wheel of the car traverses one side portion of the base 7 and is held against lateral movement by the upstanding part 8 of the guide rail. Since the guide rail is of T shape in cross section, the rail will possess maximum strength with a minimum expenditure of material.

I claim:—

1. The combination with track rails and a rerailer coöperating with one track rail, of a guide rail disposed diagonally between the track rails and leading to the rerailer, the guide rail being in the form of an inverted T comprising a base and an upstanding part; a transverse brace having ends overhanging the base portion of one track rail and overhanging the base of the guide rail; and clamping devices carried by said ends and coöperating with the base portion of said track rail and with the base of the guide rail.

2. The combination with track rails and a rerailer coöperating with one track rail, of a guide rail disposed diagonally between the track rails and leading to the rerailer; a transverse brace having ends overhanging a part of the guide rail and a part of one track rail; and screws threaded into said ends, said parts of the track rail and the guide rail having seats receiving the screws.

In testimony that I claim the foregoing as my own, I have hereto affixed my signature in the presence of two witnesses.

HENRY A. W. SMITH.

Witnesses:
    E. C. HURT, Jr.,
    E. H. SHELTON.